Sept. 21, 1965  J. W. WILSON  3,207,535
LOCKING MEANS

Filed Jan. 22, 1963  2 Sheets-Sheet 1

INVENTOR
JOHN WILLIAM WILSON
BY Dean Fairbanks & Hinds
ATTORNEYS

Sept. 21, 1965  J. W. WILSON  3,207,535
LOCKING MEANS
Filed Jan. 22, 1963  2 Sheets-Sheet 2
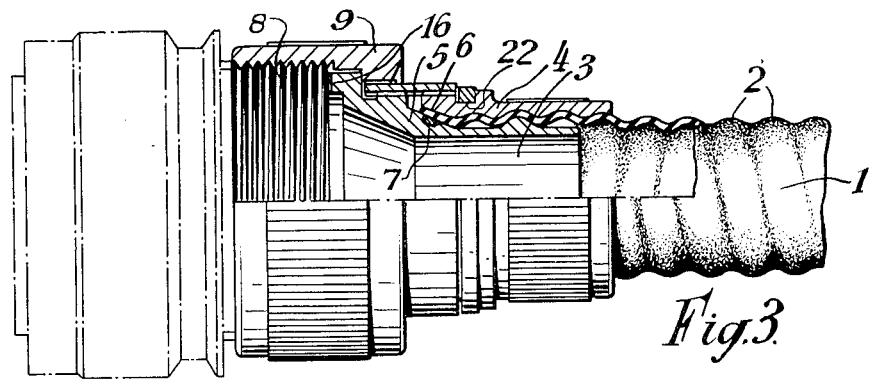
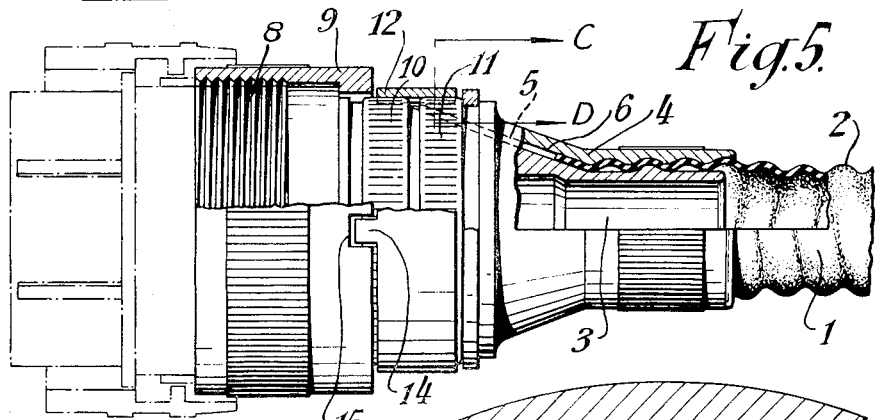
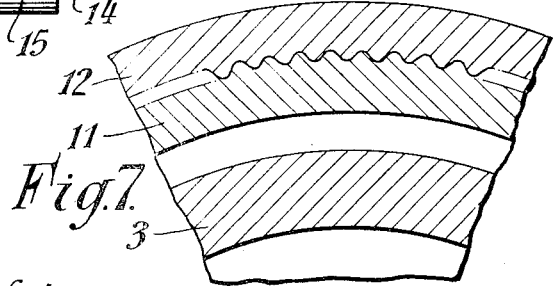
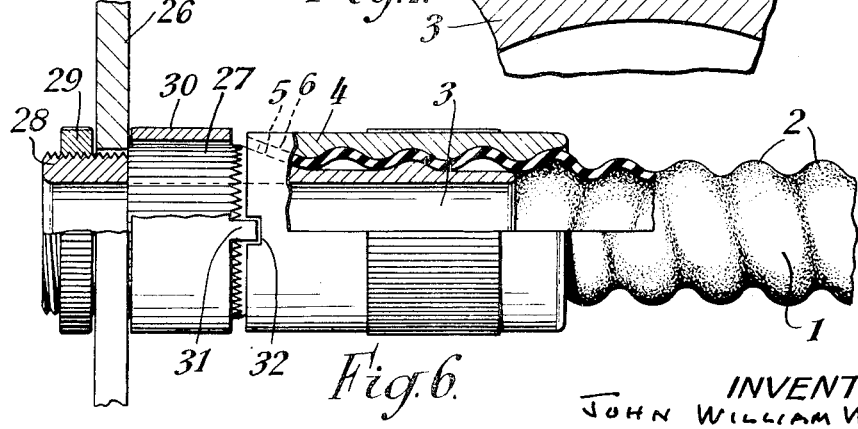
INVENTOR
JOHN WILLIAM WILSON
BY Dean, Fairbanks & Hirsch
ATTORNEYS

United States Patent Office 3,207,535
Patented Sept. 21, 1965

3,207,535
LOCKING MEANS
John William Wilson, Slough, Buckingham, England, assignor to Superflexit Limited, Slough, Buckingham, England
Filed Jan. 22, 1963, Ser. No. 253,149
Claims priority, application Great Britain, Dec. 31, 1962, 49,123/62
6 Claims. (Cl. 285—86)

The locking means forming the subject of the present invention has many applications where it is desired to prevent relative rotation between two coaxially arranged components without the employment of a specially provided locking nut or locking wire.

The locking means has however been evolved particularly for use in connection with end fittings for helically convoluted conduits for containing electric conducting wires, such end fittings including an externally threaded nipple screwing into the helically convoluted conduit and a ferrule which screws onto the conduit, the nipple and ferrule being formed with external and internal conical faces between which faces the extremity of the conduit is gripped as a result of tightening the sleeve.

Such conduits and their associated end fittings are, when in use, subjected to very large temperature variations and it has been found that a locking nut in such circumstances tends to slacken its grip during the transition period between a high and low temperature and vice versa.

The chief object of the invention is to evolve locking means which will be of a simple character but which will be effective even under difficult conditions such as for example, over a large range of temperature.

Locking means in accordance with the present invention for preventing relative rotational movement between two coaxially arranged components comprises a locking ring in non-rotatable engagement with one of the components and formed with internally arranged broachings co-operating with external knurlings on the other component, the ring when in position being locked against axial displacement.

Referring to the accompanying drawings:

FIGURES 3 to 6 are similar views illustrating four modified forms of locking means; and FIGURE 7 is a section drawn to an enlarged scale on the line C–D in FIGURE 5.

Figure 1:
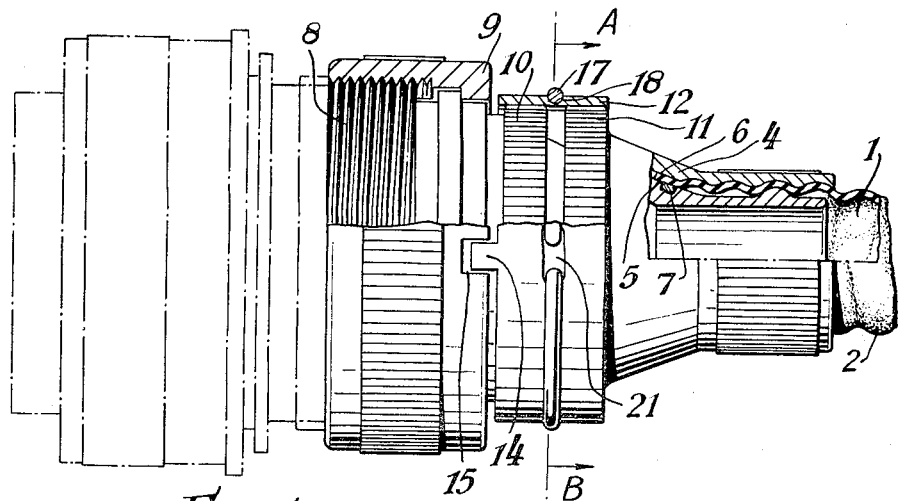
FIGURE 1 is a sectional side elevation of an end fitting incorporating one form of locking means in accordance with the invention.

The invention will now be described as applied to an end fitting for application to the extremity of a conduit 1 intended to enclose a number of bunched electrical conductors, the conduit being formed with internally and externally arranged helical convolutions 2.

The end fittings illustrated each include an internal externally threaded nipple 3 which is screwed into the end of the conduit and a ferrule 4 which is internally threaded and screws onto the end of the conduit, nipple 3 being formed with a conical part 5 and ferrule 4 being formed with an internally arranged conical part 6.

Figure 4:
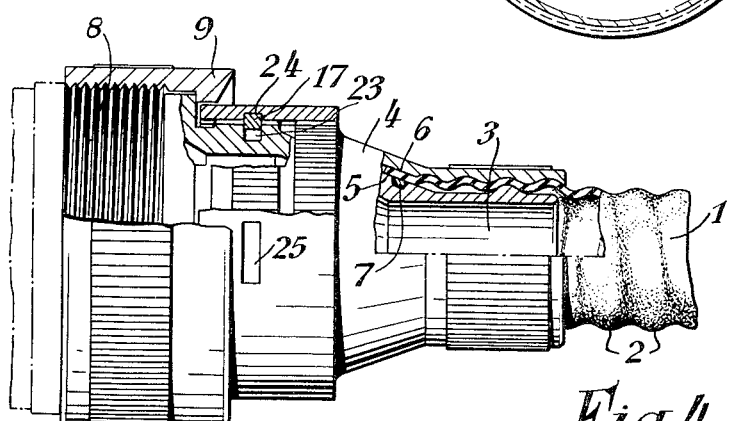

The extremity of the conduit is bell-mouthed and is gripped between the two conical parts to ensure a good seal. The screw threads on the nipple and ferrule have a pitch greater than the pitch of the convolutions of the conduit so that the action of screwing the parts into position tends to flatten out the convolutions and increase the effective diameter of the end of the conduit an amount such that the internal diameter of nipple approximates to the internal diameter of the rest of the conduit. The advantage of this is that the end of the nipple will then not constitute an internal obstruction to the threading of the electrical conductors through the conduit. A sealing washer 7 is preferably mounted in an annular groove in the conical part 5 to further improve the seal as shown in FIGURES 1, 3 and 4.

In the case of FIGURES 1 to 5, the nipple 3 is secured to a multi-pin or multi-socket head 8 by a retaining nut 9.

The nipple 3 and ferrule 4 are formed with knurled flanges 10 and 11, the flanges having the same external diameter and being spaced apart when the nipple and ferrule have been fully tightened to firmly grip the end of the conduit.

To prevent relative rotational movement of the nipple 3 and ferrule 4 which might result in slackening their grip on the end of the conduit, a locking ring 12 is provided which is broached internally as at 13, the internal broachings and external knurlings corresponding in depth and spacing so that they interengage when the ring is slid axially into its operative position.

In FIGURES 1 and 5 the locking ring 12 is shown provided with a tongue 14 which enters a notch 15 in the retaining nut 9, thereby connecting the retaining nut 9 and locking ring 12 together against relative rotation.

To prevent relative rotation of the nipple 3 and the part 8 onto which the retaining nut 9 screws the adjacent faces of the parts may be formed with interengaging serrations 16 thus preventing any possibility of the nipple, ferrule and locking ring being turned with the retaining nut if an attempt was made to slacken the retaining nut without first removing the locking ring.

The tongue and notch interengagement although only shown in FIGURES 1 and 5 is preferably used in the constructions shown in FIGURES 3 and 4.

To secure the locking ring in position a circlip 17 is provided.

Figure 2:
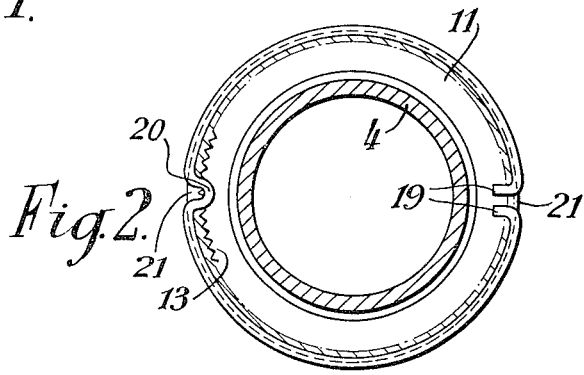
FIGURE 2 is a section on the line A–B in FIGURE 1.

In FIGURES 1 and 2 the circlip 17 is seated in a circumferential groove 18 in the locking ring, the ends 19 and an intermediate part 20 of the circlip projecting inwardly through slots 21 in the locking ring so that they lie between the knurled flanges 10 and 11, thus preventing movement of the locking ring in an axial direction.

In FIGURES 3 and 5 the circlip 17 is mounted in a circumferential groove 22 in the ferrule and engages the adjacent end of the locking ring.

In FIGURE 4 the circlip is compressed into a circumferential groove 23 in the knurled flange 10 of the nipple and when the locking ring is slid into position expands into locking engagement with an internal groove 24 in the locking ring. To enable the circlip to be compressed out of engagement with the groove 24 when it is desired to remove the locking ring a tool is inserted through a slot 25 in the locking ring.

Referring now to FIGURE 6, the conduit in this case is intended to be associated with a panel or the like 26. In this case the nipple 3 is externally knurled at 27 and has an externally screw threaded reduced diameter part 28 which is passed through a hole in the panel and receives a securing nut 29.

To prevent the ferrule 4 being turned to slacken its grip on the end of the conduit a locking ring 30 is provided which is internally broached to engage the knurlings on the nipple, the locking ring having a projecting tongue 31 engaging a notch 32 in the end of the ferrule.

It will be appreciated that the locking ring will be slid into its operative position before the conduit is mounted on the panel.

Due to the positive nature of all the forms of locking means hereinbefore described they will not be affected by temperature variations and consequently there will be no slackening of the grip on the conduit.

I claim:

1. Locking means for the end fitting of an electrical conduit having a convoluted casing comprising a nipple fitting into the casing and having an enlarged flange at its outer portion, a ferrule fitting over said casing and gripping the latter between the nipple and the ferrule, said ferrule having an enlarged flange at its outer portion of configuration complementary to that of the nipple flange and coaxial therewith and slightly spaced therefrom, a locking ring encompassing both of said flanges and being axially slidable thereon, said locking ring and said flanges having interengaging means preventing relative rotation therebetween, a socket, having a threaded periphery, a retaining nut encompassing said socket and clamping the nipple thereagainst, and complementary interengaging means on said nut and said locking ring to prevent relative rotary movement therebetween.

2. The combination set forth in claim 1 in which said complementary interengaging means comprise a recess defined by the nut and a tongue protruding from said locking ring.

3. The combination set forth in claim 1 in which said spaced flanges define a groove therebetween and an annular spring clip encompasses said locking ring and has portions protruding through said locking ring into said groove to prevent sliding movement of said locking ring.

4. The combination set forth in claim 1 in which one of said flanges defines an external annular groove within which is received an annular spring clip normally tensed to move outwardly and said locking ring defines an internal annular groove adapted to be moved into radial alignment with said external annular groove and said spring clip when said locking ring encompasses said flanges to prevent sliding movement of said locking ring.

5. The combination set forth in claim 4 in which said locking ring defines a through slot radially aligned with the annular groove therein to provide external access to said spring clip for release thereof.

6. The combination set forth in claim 1 in which said flanges are circular and of the same diameter and each has a plurality of grooves in the periphery thereof extending parallel to the axis of the nipple and said locking ring has internal grooves complementary to those in said flanges.

References Cited by the Examiner

UNITED STATES PATENTS

| 1,735,196 | 11/29 | Boyton | 285—330 |
| 1,851,992 | 4/32 | Smith | 285—86 |
| 2,423,632 | 7/47 | Ansorge | 285—249 |
| 2,798,744 | 7/57 | Budnick | 285—161 |
| 2,992,018 | 7/61 | Rosan | 285—161 |

FOREIGN PATENTS

| 577,404 | 6/59 | Canada. |
| 302,044 | 12/28 | Great Britain. |
| 803,726 | 10/58 | Great Britain. |

CARL W. TOMLIN, *Primary Examiner.*